US006653022B2

(12) United States Patent
Nordlinder et al.

(10) Patent No.: US 6,653,022 B2
(45) Date of Patent: Nov. 25, 2003

(54) VANADIUM OXIDE ELECTRODE MATERIALS AND METHODS

(75) Inventors: Sara Nordlinder, Uppsala (SE); Kristina Edström, Vänge (SE); Torbjörn Gustafson, Vänge (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 241 days.

(21) Appl. No.: 09/872,689

(22) Filed: May 31, 2001

(65) Prior Publication Data

US 2002/0086212 A1 Jul. 4, 2002

Related U.S. Application Data

(60) Provisional application No. 60/259,255, filed on Dec. 28, 2000.

(51) Int. Cl.$^7$ .......................... H01M 4/62; C01G 31/02
(52) U.S. Cl. ................... 429/232; 429/217; 423/594.8
(58) Field of Search .............................. 429/231.5, 232, 429/217, 212; 423/592, 594.8

(56) References Cited

U.S. PATENT DOCUMENTS

| 5,952,125 A | 9/1999 | Bi et al. ................... 429/231.2 |
| 6,210,800 B1 | 4/2001 | Nesper et al. .............. 428/367 |

FOREIGN PATENT DOCUMENTS

| EP | 0856490 | 8/1998 |
| WO | WO 9826871 | 6/1998 |

OTHER PUBLICATIONS

Ajayan et al., *Nature*, "Carbon Nanotubes as Removable Templates for Metal Oxide Nonocomposites and Nanostructures", vol. 375, 564–567 (Jun. 1995).

Muhr et. al., *Advanced Materials, Vanadium Oxide Nanotubes—A New Flexible Vanadate Nanophase*, vol. 12, No. 3, 231–234 (2000).

Winter et al., "Insertion Electrode Materials for Rechargeable Lithium Batteries", *Adv. Mater.*, 10 (1998) pp. 725–762.

Chung et. al., "Rechargeable Lithium cells with modified vanadium oxide cathodes", *J. Power Sources*, 84, (1999) pp. 6–11.

Shembel et. al., *J. Power Sources*, 81–82 (1999) pp. 6–11.

Le et. al., *J. Electrochem. Soc.*, 142, No. 6 (1995), pgs L102–L103, "Aerogels and Xerogels of $V_2O_5$ as Intercalation Hosts".

Pistoia et. al., J. Electrochem Soc., vol. 137, No. 8, Aug. 1990.

Spahr et. al. *Angew. Chem. Int. Ed. Engl.*, 37, No. 9 (1998), pgs 1263–1264 "Redox–Active Nanotubes of Vanadium Oxide".

Krumeich et. al., *J. Am. Chem. Soc.*, 121, (1999), pp. 8324–8331.

Reinoso et. al., *Helv. Chim. Acta.*, 83, (2000), pp. 1724–1728.

W. Tremel, *Angew. Chem. Int. Ed.*, 38, No 15 (1999), pp. 2175–2179.

Spahr et. al. *J. Electrochem. Soc.*, 146(8), 2780–83 (1999).

*Primary Examiner*—Patrick Ryan
*Assistant Examiner*—Thomas H. Parsons
(74) *Attorney, Agent, or Firm*—Jenkens & Gilchrist, P.C.

(57) ABSTRACT

The present invention relates to the use of vanadium oxide nanotubes as electrode material in a rechargeable lithium battery. The invention further provides the method of making and uses for electrodes comprising vanadium oxide nanotubes.

25 Claims, 4 Drawing Sheets

VANADIUM OXIDE ELECTRODE MATERIALS AND METHODS

CROSS-REFERENCES TO RELATED APPLICATIONS

This Application for Patent claims the benefit of priority from, and hereby incorporates by reference the entire disclosure of, co-pending U.S. Provisional Application for Patent Serial No. 60/259,255 filed on Dec. 28, 2000.

TECHNICAL FIELD OF THE INVENTION

This invention relates to the use of vanadium oxide nanotubes as electrode material in a rechargeable lithium battery.

BACKGROUND OF THE INVENTION

Vanadium oxides have a long history as potential electrode materials for rechargeable lithium batteries due to their ability to insert large amounts of lithium [Winter et. al., *Adv. Mater.*, 10,725(1998); Chung et. al, *J. Power Sources*, 84, 6 (1999); Shembel et. al, *J Power Sources*, 81–82, 480 (1999); Lee et. al., *J. Electrochem. Soc.*, 142, L102 (1995); Pistoia et. al., *Solid State Ionics*, 13,311 (1984)]. Different synthesizing and preparation methods have been developed to achieve higher specific capacities and longer cycle life [Chung et. al., *J. Power Sources*, 84,6 (1999); Shembel et. al, *J. Power Sources*, 81–82,480 (1999)]. Promising results have been reported for amorphous low-crystalline materials e.g. $V_2O_5$ xerogels and aerogels [Lee et. al., *J. Electrochem. Soc.*, 142, L102 (1995]. Another material that has demonstrated large capacities as a cathode material is the vanadate $Li_{X+1}V_3O_8$ [Winter et. al, *Adv. Mater.*, 10, 725 (1998); Shembel et. al, *J. Power Sources*, 81–82, 480 (1999)].

The synthesis of vanadium oxide nanotubes ($VO_x$—NTs) by a ligand assisted templating approach has recently been described by Spahr et al. [*Angew. Chem. Int. Ed. Engl.*, 37,1263 (1998)]. The tubes consist of several vanadium oxide layers, commonly in a scroll-like arrangement, separated by structure-directing agents (templates). The tubes can be up to 15 μm long and consist of as many as 30 vanadium oxide layers. The outer and inner diameters vary between 15 to 100 nm and 5 to 50 nm respectively. The size depends on the precursors chosen for the synthesis and can therefore be controlled in a rough manner [Krumeich et. al., *J Am. Chem. Soc.*, 121, 8324 (1999)].

The synthesis is performed with e.g. primary alkylamines as templating molecules. The embedded amine molecules can then readily be exchanged by various metal cations, i.e. alkaline, alkaline earth and transition metals, under preservation of the tubular morphology [Reinoso et. al., *Helv. Chim. Acta.*, 83, 1724 (2000)]. This property gives a unique opportunity to design tailor-made functional materials. However, attempts to substitute the amine by lithium-ions have so far not been successful [Reinoso et. al., *Helv. Chim. Acta.*, 83, 1724 (2000)].

The investigations into these types of inorganic nanotubes, e.g. dichalchogenides and oxides, has increased rapidly over the last decade [W. Tremel, *Angew. Chem. Int. Ed.*, 38, 2175 (1999)]. Redoxactive tubes, containing transition metals, are naturally of fundamental interest for both catalytical and electrochemical purposes.

A method for the preparation of separable vanadium oxide nanotubes is discussed in PCT publication, WO9826871 by Nester et. al., which recently issued as U.S. Pat. No. 6,210, 800.

Spahr et. al. [*J. Electrochem. Soc.*, 146, 2780–83 (1999)] teach the electrochemical characteristics of vanadium oxide nanotubes, studied with electrodes consisting of a mixture of vanadium oxide nanotubes and teflonised carbon black, each representing 50% of the mixture. Cyclic voltammograms of templated vanadium oxide nanotubes recorded at 50 μV/sin 1MLiClO$_4$ in propylene carbonate, displayed a stable specific charge of about 120 mAh/g, obtained for the Li insertion during the first five cycles of voltammetric measurements. Thereafter, the specific charge gradually decreases with increasing cycle number to less than 100 mAh/g after ten cycles.

The present invention provides an improved vanadium oxide electrode, which employs improved methods of electrode synthesis, cation exchange, and choice of electrolytes than those taught in the prior art. Numerous differences exist between the present invention and the teachings of Spahr et. al. including but not limited to, the use of hexadecylamine as templating molecule by Spahr. et. al., compared to dodecylamine used in the present invention, use of a higher percentage of vanadium oxide nanotubes in the electrode of the present invention compared to the teachings of Spahr et. al., and most importantly a choice of electrolyte different from the one taught by Spahr et. al. The present invention therefore, represents an improvement over the prior art.

SUMMARY OF THE INVENTION

According to the present invention, an electrode comprising vanadium oxide nanotubes is provided. Further provided are the method of making and the use of the electrode in a rechargeable lithium battery.

BRIEF DESCRIPTION OF THE DRAWINGS

The following drawings form part of the present specification and are included to further demonstrate certain aspects of the present invention. The invention maybe better understood by reference to one or more of these drawings in combination with the detailed description of the invention presented herein.

DETAILED DESCRIPTION OF THE INVENTION

Figure 1:
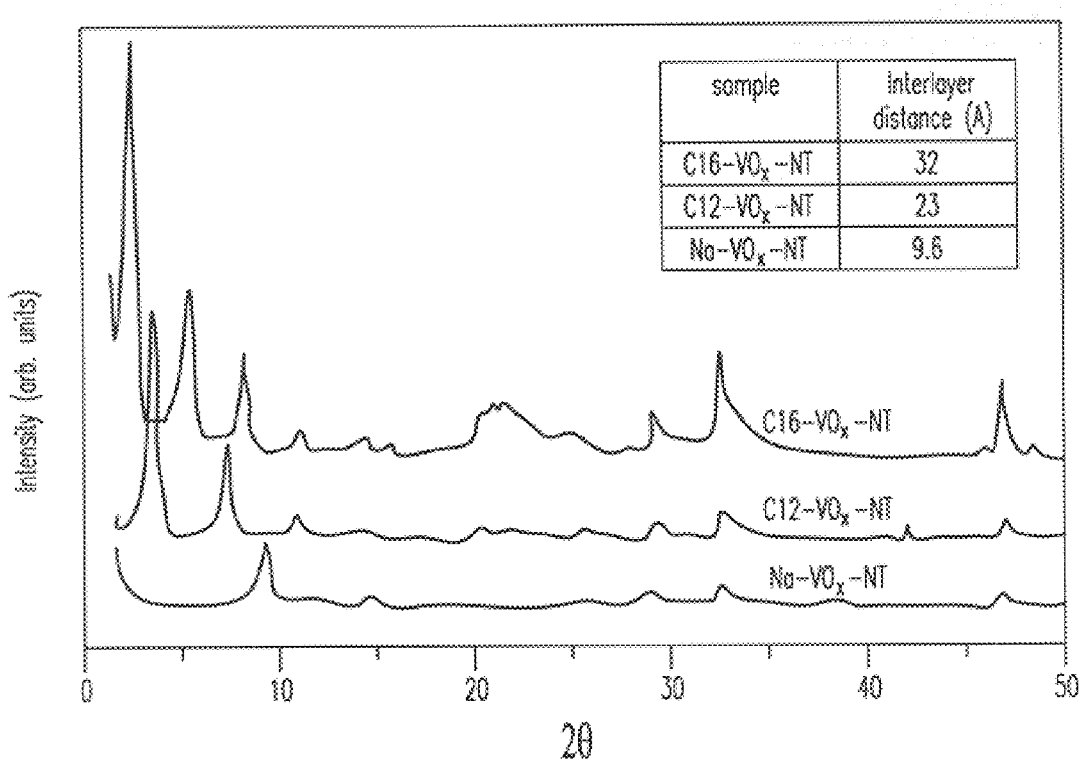
FIG. 1 represents X-ray powder diffractograms for C16-$VO_x$—NTs, C12-$VO_x$—NTs and Na—$VO_x$—NTs. The inset displays the inter-layer distances as derived from X-ray diffraction results.

The present invention relates to the study of vanadium oxide nanotubes ($VO_x$—NTs) in a lithium-ion battery context. Without limiting its scope, the present invention relates generally to the use of $VO_x$—NTs, and specifically to the use of as-synthesized (primary alkylamines as templating molecules) or cation-substituted $VO_x$—NTs, as electrodes in a rechargeable lithium battery. In an earlier report $VO_x$—NTs showed poor performance as cathode material with rapidly decreasing capacity [Spahr et. al., J. Electrochem. Soc., 146,2780(1999)]. The present invention overcomes this problem by providing stable or increasing capacity while cycling. In addition, the present invention improves on the prior art by employing improved methods of electrode synthesis, cation exchange, and choice of electrolytes than those taught by the prior art. Indeed, the differences which exist between the present invention and the teachings of Spahr et. al. include, the use of hexadecylamine as templating molecule by Spahr. et al., compared to dodecylamine used in the present invention, use of a higher percentage of vanadium oxide nanotubes in the electrode of the present invention compared to the teachings of Spahr et. al., and most importantly a choice of electrolyte different from the one taught by Spahr et. al. As discussed in detail herein, the present invention further improves on the prior art by displaying higher charge capacities, both initially and post-cycling.

In a preferred embodiment of the invention, the $VO_x$—NTs are prepared by the method of Krumeich et al. [J. Am. Chem. Soc., 121, 8324 (1999)]. Specifically, Vanadium triisopropoxide $((CH_3)_2CHO)_3VO$; (Aldrich)) is used as precursor, and the primary amines hexadecylamine, $C_{16}H_{33}NH_2$, and dodecylamine, $C_{12}H_{25}NH_2$ (99%, Aldrich), are used as templating molecules. A solution of vanadium precursor and a primary amine in a molar ratio of 2:1 in absolute ethanol (3 mL/g) is stirred under inert atmosphere for 1 hour. The resulting yellow solution of the alkoxide-amine adduct was hydrolysed with water (5 mL/g of vanadium precursor) under vigorous stirring. After aging (12–96 hours), an orange composite of surfactant and hydrolyzed vanadium oxide component was obtained. The hydrothermal reaction of this composite in an autoclave at 180° C. (2–7 days) results in a black powder, consisting of vanadium oxide nanotubes with embedded hexadecylamine or dodecylamine (C16-$VO_x$—NTs or C12-$VO_x$—NTs, notations as in [Krumeich et al., J. Am. Chem. Soc., 121, 8324 (1999)]). The resulting product is washed with ethanol and hexane to remove residues of unreacted amine or decomposition products and then dried under vacuum at 80° C. for >12 h.

In a preferred embodiment of the invention, the primary amines of the templating molecules can be readily exchanged by various metal cations without destroying the tubular structure. Without limiting the scope of the invention, the metal ions that may be used in the exchange process are $Mn^{2+}$, $Mg^{2+}$, $Ca^{2+}$, $Fe^{2+}$, $Fe^{3+}$, and $Na^+$ inter alia.

Substitution by Na-ions is performed with C12-$VO_x$—NTs which have proved to be the best starting material for exchange reactions. [Krumeich et al., J. Am. Chem. Soc., 121, 8324 (1999)]. The $Na^+$ exchange is performed as described by Krumeich et al. [J. Am. Chem. Soc., 121,8324 (1999)] using NaCl salt (puriss., Kebo). Specifically, the exchange reactions are performed by stirring a suspension of nanotubes (about 100 mg) in 25 mL of ethanol with an excess of the exchanging NaCl salt for 12 hours at room temperature. Following substitution by Na-ions, the material is dried under vacuum at 80° C. for 12 hours.

In a preferred embodiment of the invention, the $VO_x$—NT powder is admixed with carbon black (Shawinigan Black) and EPDM (Ethylene Propylene Diene Terpolymer) binder (5% by weight in solvent, a preferred solvent being cyclohexane). A preferred composition of the resulting admixture is 60–90% by weight of $VO_x$—NT powder, 4–30% by weight of carbon black, and 2–20% by weight of EPDM binder. A second preferred composition of the resulting admixture is 70–85% by weight of $VO_x$—NT powder, 5–20% by weight of carbon black, and 5–15% by weight of EPDM binder. A more preferred composition of the admixture is 80% by weight of $VO_x$—NT powder, 10% by weight of carbon black, and 10% by weight of EPDM binder. In yet another embodiment of the invention, the $VO_xNT$ powder, carbon black, and EPDM binder can be admixed to give a final proportion of 80:15:5 by weight. In one embodiment of the invention, EPDM binder can be substituted with polyvinylidene fluoride (PVDF). PVDF is a commonly used binder material for lithium-ion batteries, which can be substituted in place of EPDM without significantly affecting the performance of the electrode material. The mixture is stirred on a magnetic stirrer for twenty four (24) hours after which the slurry is spread evenly onto a graphitised aluminum foil. Circular electrodes (20 mm in diameter) are punched out and dried under vacuum at 120° C. for >12 h in an argon-filled glove box ($O_2/H_2O<1$ ppm) prior to use.

In a preferred embodiment of the invention, two-electrode cells are manufactured in a glove box, using $VO_x$-NTs as working electrodes and lithium foil as counter electrodes. In a preferred embodiment of the invention, the electrode comprising $VO_x$-NTs serves as a cathode, and an electrode comprising lithium serves as an anode. A glass fibre separator soaked in electrolyte separates the two electrodes. In a preferred embodiment of the invention, the electrolyte consists of a 1 M solution of lithium salt dissolved in solvents selected from a group consisting of ethylene carbonate (EC), dimethyl carbonate (DMC), propylene carbonate (PC), ethylmethyl carbonate (EMC), 1,2-dimethoxyethane (DME), diethyl carbonate (DEC), and mixtures thereof In a preferred embodiment of the invention, the electrolyte is prepared by dissolving a 1 M solution of lithium salt in a mixture of ethylene carbonate and dimethyl carbonate, at a respective ratio of 2:1 by volume (Selectipur®, Merck).

In a preferred embodiment of the invention, three different lithium salts are individually used namely, $LiBF_4$ (Battery grade, Tomiyama), $LiPF_6$ (Selectipur®, Merck) and the imide salt $LiN(CF_3SO_2)_2$ (LiTFSI) (3M Industrial Chemistry Products Division). The solvents are used as received, while the salts are dried at 120° C. under vacuum in the glove box prior to use. The laminates are packed in a polymer coated aluminum bag, evacuated and sealed.

In a preferred embodiment of the invention, all two-electrode cells are galvanostatically cycled using a Digatron BT S-600 battery testing system. The cells are cycled between 1.8 and 3.5 V (vs. $Li/Li^+$) with a current loading ranging from 25 mA/g to 100 mA/g. The potential range is chosen on the basis of earlier reported cycling for $V_2O_5$ [Winter et. al., Adv. Mater., 10, 725 (1998)].

In a preferred embodiment of the invention, X-ray diffraction (XRD) on the powders is performed on a SIEMENS 5000 diffractometer (CuKx radiation). In situ and ex situ XRD measurements are made in transmission mode using a STOE & CIE GmbH STADI powder diffractometer (CuKx radiation), fitted with a position-sensitive detector. The in situ cell is charged and discharged potentiostatically using a MacPileII™ cycling system. The cell is allowed to equilibrate before each diffraction pattern was recorded. The ex situ measurements are made on electrodes that had been removed from the cells, rinsed in DMC and finally vacuum-sealed in a polymer coated aluminum bag. A diffractogram for a non-cycled electrode, is also recorded as a reference.

The morphology of the material is investigated by transmission electron microscopy (TEM). The characterization is performed on a JEOL 2000 FXII TEM with a 200 kV working voltage.

Without limiting its scope, the rechargeable battery of the present invention may be used as a power source for any and all portable electronic devices, including without limitation, cellular phones, camcorders, lap top computers, radios, compact disc players, audio and video cassette players, pagers, and handheld personal digital assistant (PDA) devices.

WORKING EXAMPLES

Example 1

Structure and Morphology

The XRD patterns for the as-made materials showed regular 001-type reflections at $2\theta<20°$ generated by the regular interlayer distances of the tube walls as seen in FIG. 1. The distances are directly related to the length of the carbon chain of the templating primary amine [Krumeich et al., *J. Am. Chem. Soc.*, 121, 8324 (1999)]. The 001-peak represents the peak at the lowest $2\theta$ value. For cation substituted material the 001-peak is shifted towards higher $2\theta$ indicating a decrease in interlayer distance as seen in FIG. 1. The layer separations for Na$^+$-exchanged tubes (Na—VO$_x$—NTs, notation as in [Krumeich et al., *J. Am. Chem. Soc.*, 121, 8324 (1999)]) vary between 9.6 Å and 11 Å. The variations can possibly be caused by small rearrangements of the structure within the VO$_x$-layers that occurs over time. The tubular structure is, however, preserved.

The peaks at $2\theta>20°$, probably corresponding to hk0 reflections, show no such shift for the three VO$_x$—NT materials suggesting that the intralayer structure is the same, regardless of which molecules are embedded. The exact atomic structure within the layers has not yet been resolved.

Figure 2:
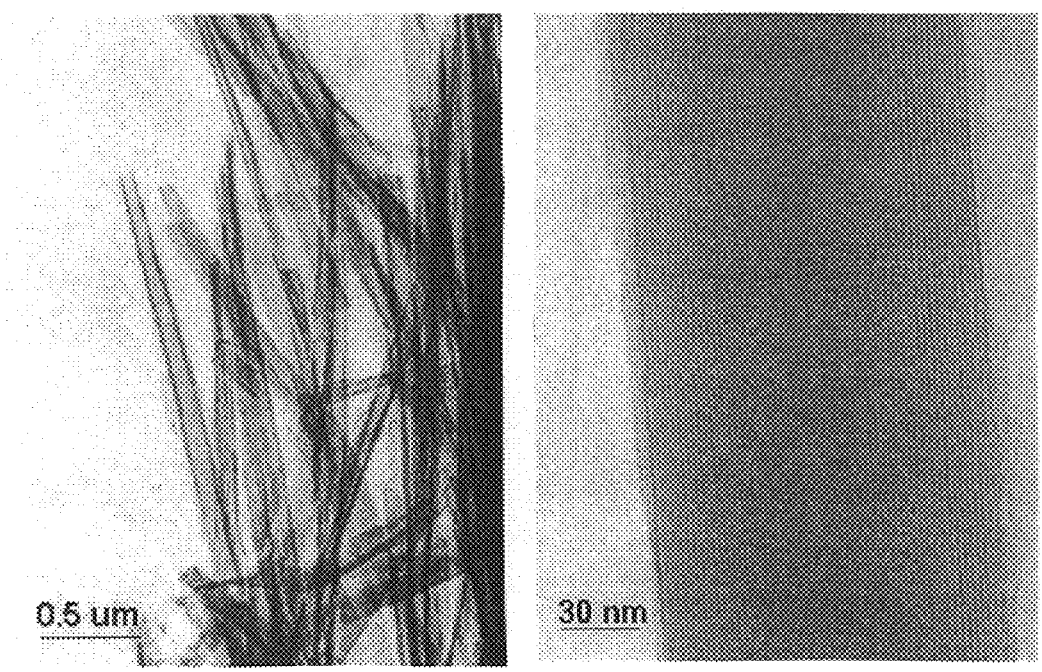
FIG. 2 represents Transmission Electron Micrographs showing the tubular structure of the $VO_x$—NTs. The micrograph on the left shows Na—$VO_x$—NTs. The micrograph on the right shows a vanadium oxide nanotube with hexadecylamine as templating molecule.

TEM micrographs confirm the tubular morphology of the material as seen in FIG. 2. The images also confirm that the tubular structure is preserved after substitution by Na$^+$-ion.

Example 2

Electrochemical Measurements

Figure 3:
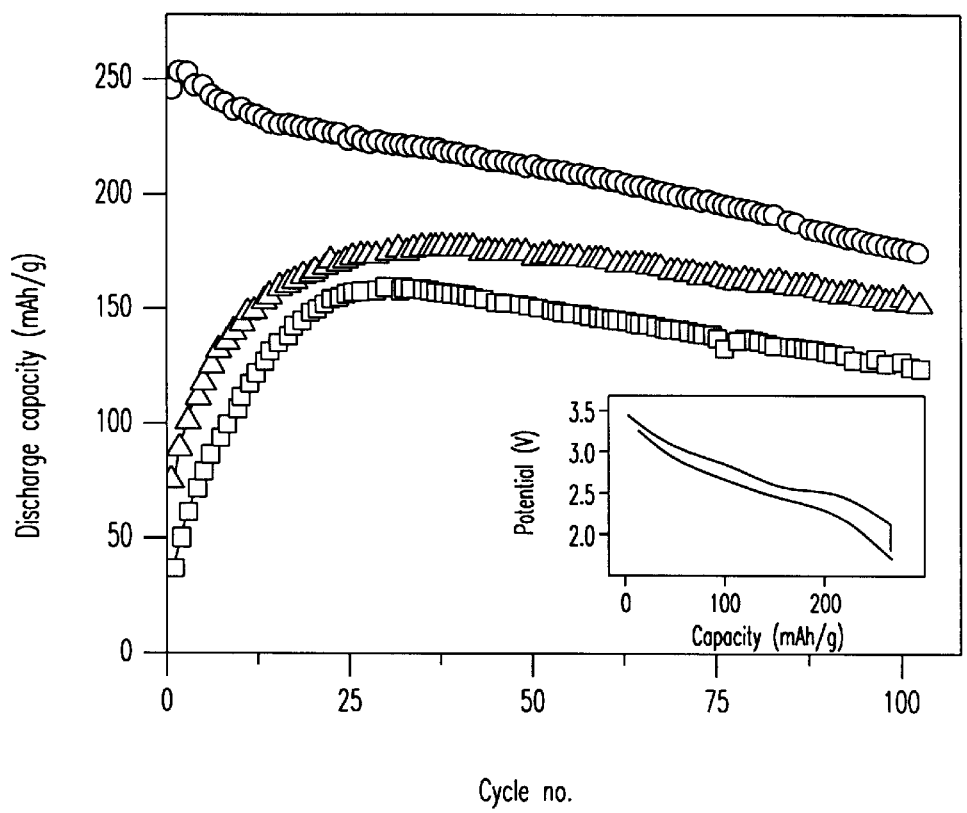
FIG. 3 represents the discharge capacities for cells cycled with three different salt in the electrolytes; LiTFSI (○), LiBF$_4$ (Δ), LiPF$_6$ (□). The inset displays its first discharge/charge cycle for the cell cycled with LiTFSI-electrolyte. The potential is given vs. Li/Li$^+$.

Cells comprising both the as-synthesized (C12- and C16-VO$_x$—NTs), and the Na-exchanged material show reversible charge and discharge cycles. The discharge/charge curves of the Na-exchanged materials are continuous with a tendency to a plateau at 2.5 V as seen in the inset of FIG. 3. The absence of staging is common for amorphous and non-crystalline materials. The capacities are comparable to the theoretic capacities for other vanadium oxide materials. The materials with embedded amine molecules generally have lower capacities than the Na$^+$-exchanged material, probably mostly due to their higher molecular weight.

Figure 6:
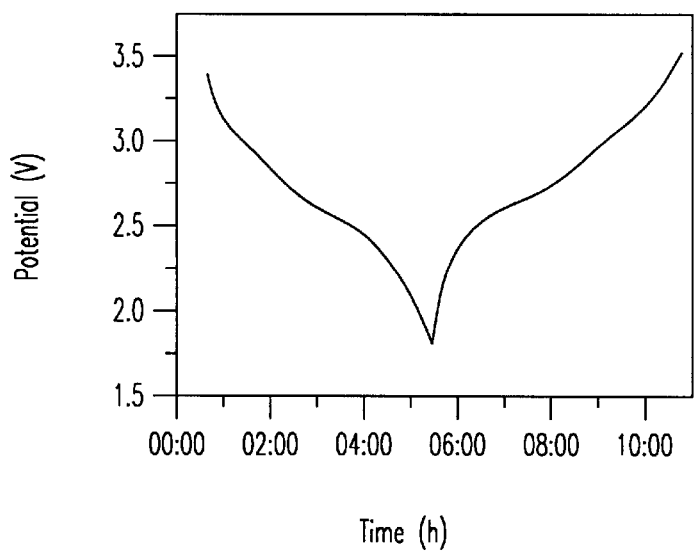
FIG. 6 represents a cycling curve of a vanadium oxide nanotube.
Figure 7:
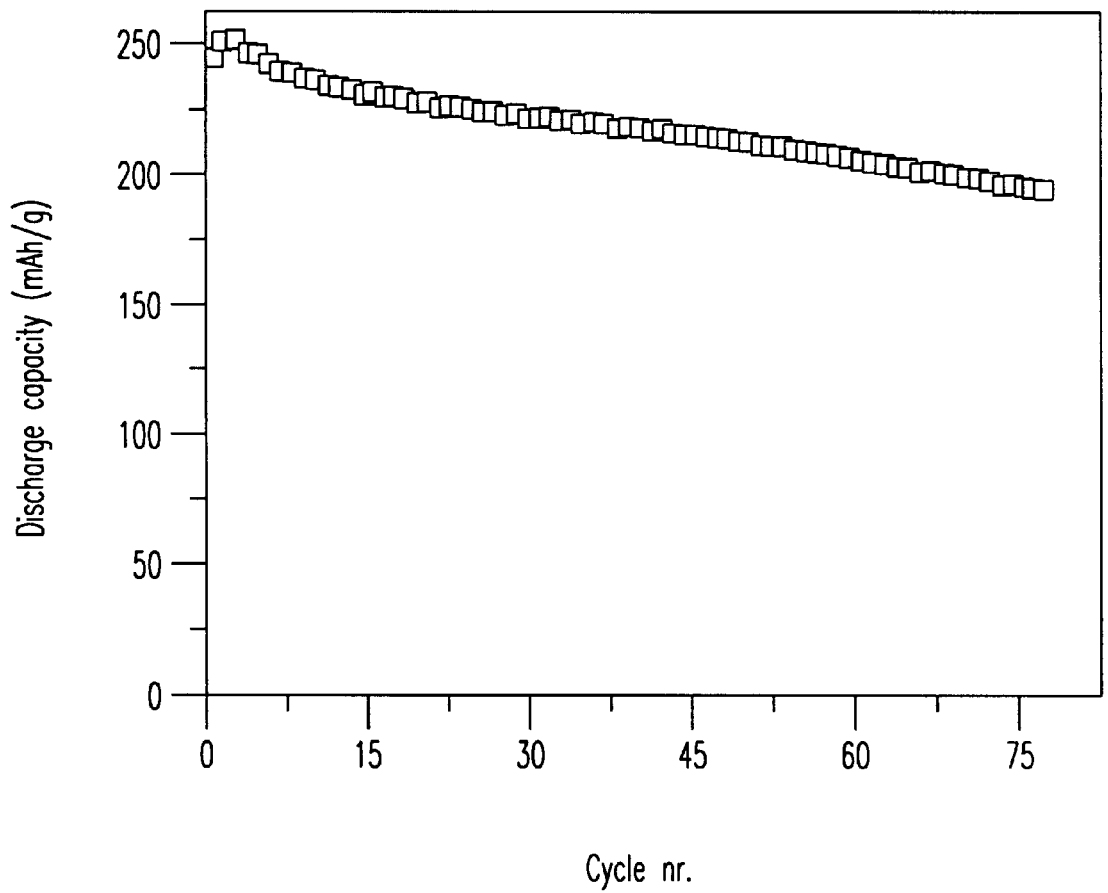
FIG. 7 represents the first 75 discharge/charge cycles obtained.

The cell performance is closely dependent on which salt is used in the electrolyte. Cells made with LiBF$_4$ and LiPF$_6$ containing electrolytes show increasing capacities over time as seen in FIG. 3. The capacity seems to arrive at a maximum level at which point it levels off. The discharge/charge cycling curve for one cycle when using vanadium oxide nanotubes with LiTFSI is shown in FIG. 6. After 15 cycles the specific capacities have reached 160 mAh/g for LiBF$_4$ and 135 mAh/g for LiPF$_6$ salt. After 30 cycles the capacities are 170 mAh/g and 155 mAh/g respectively. This can be compared to the theoretical capacity for Li$_x$V$_2$O$_5$ which is 147 mAh/g (x=1). The current loading used for this investigation (50 mA/g) corresponds to a discharge rate of 1.5–2 h initially and 3–4 h at the maximum capacity. A diagrammatic representation of the first 75 discharge/cycles is shown in FIG. 7.

Na—VO$_x$—NT electrodes cycled with LiTFSI salt show a totally different behavior as seen in FIG. 3. The capacity is initially at a high level, around 250 mAh/g, and then slowly decreases. After 100 cycles the capacities have dropped to approximately around 170 mAh/g, which corresponds to a decrease of approximately 30% from the initial value. A current load of 50 mA/g corresponds, in this case, to a discharge rate of approximately C/4 i.e., a discharge time of four (4) hours. Compared to LiPF$_6$ salt, LiTFSI has a superior thermal and hydrolytic stability. However, the practical use of LiTFSI salt has been limited since it has proved to cause severe corrosion of the aluminum current collector at high potentials. The salt has corrosion current pitting potential of 3.55 V (vs Li/Li$^-$). There maybe a possibility that the decrease in capacity of the cells cycled with TFSI-electrolyte is due to corrosion of the current collector, although the cells were cycled above 3.5 V.

The theoretical capacity for C12-VO$_x$-NTs and Na-VO$_x$-NTs can be roughly estimated based on the elemental compositions reported by Reinoso et. al. For C12-VO$_x$—NTs the theoretical capacity, calculated for transfer of one electron per vanadium atom, would be approximately 191 mAh/g, when cycled with LiTFSI. Under the same conditions, the theoretical capacity for Na$_x$—VO$_x$—NTs would be 224 mAh/g. This implies that all of the vanadium in the oxide layers is involved in the origination of the capacity, or alternatively that more than one electron per vanadium atom is being transferred.

The key to the successful cycling of VO$_x$—NT electrodes can be partly attributed to the preparative procedure. Other possible reasons for the successful cycling are choice of voltage range, choice of salt and solvent in the electrolyte, and the relative proportions of the VO$_x$—NT, carbon black and EPDM binder used in the synthesis of the electrodes. Packing the cells in the polymer coated aluminum bags simulates the environment in a real lithium-ion battery and securely separates the components from the normal atmosphere.

Example 3

In Situ and Ex Situ XRD Measurements

Figure 4:
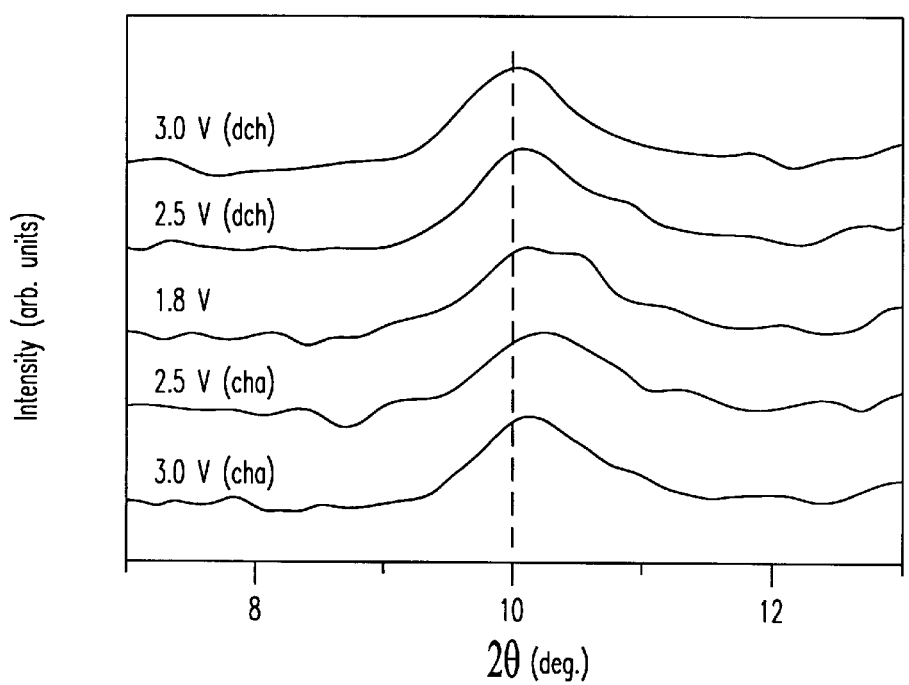
FIG. 4 represents the in situ X-ray diffractograms recorded during the first discharge (dch)/charge (cha) of a cell using LiBF4 in the electrolyte. The potentials are given vs. Li/Li$^+$.

According to the in situ XRD measurements of a Na—VO$_x$—NT electrode during the first cycle, in LiBF$_4$ electrolyte, no large structural changes occur during charge and discharge. The peak with highest intensity, that is the 001-reflection, was carefully studied at different potentials (FIG. 4). The peak position did not shift significantly, indicating that the interlayer distances do not change notably during cycling. There seems to be a reversible peak appearing at around 10.5° in $2\theta$, reaching its maximum intensity at the fully discharged state as seen in FIG. 4. This might be caused by small rearrangement in the interlayer structure due to the oxidation/reduction of vanadium.

Figure 5:
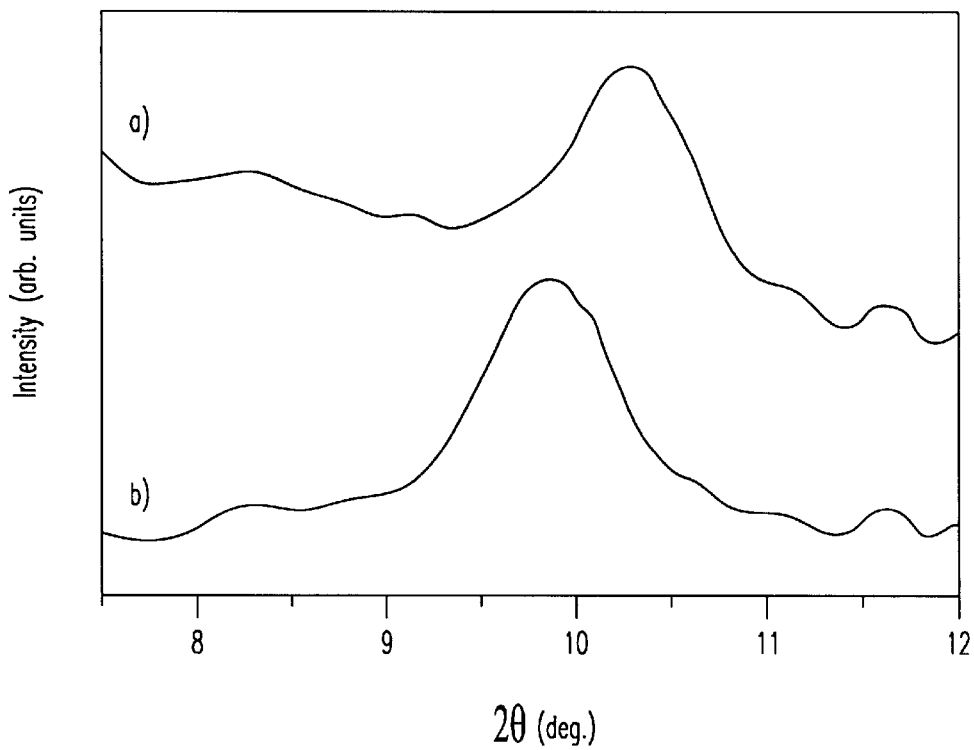
FIG. 5 represents exsitu X-ray diffractograms for: a) Na—$VO_x$—NT cell cycled 100 times with LiTFSI salt in the electrolyte; b) original Na—$VO_x$—NT cell.

Diffraction measurements were also made ex situ on cells that had been used for 100 cycles. The diffractogram for a Na—VO$_x$—NT electrode cycled with LiTFSI salt in the electrolyte is displayed in FIG. 5, along with a diffractogram for an original Na—VO$_x$—NT electrode (not cycled). The 001-reflection was clearly visible even after 100 cycles, indicating that the tubular structure remains intact, at least to a large extent. The peak shifted from 9.9° in 2θ for the original electrode to 10.3° in 2θ for the cycled electrode, corresponding to a decrease in interlayer distance of approximately 0.35 Å. This might again be an effect of small rearrangements in the interlayer structure while cycling. No additional peaks could be seen in the diffractograms, confirming that no large rearrangements of the structure occurs even after prolonged cycling.

What is claimed is:

1. A method for preparing a vanadium oxide nanotube electrode, the method comprising:
    admixing a particulate form of vanadium oxide nanotubes with carbon black and EPDM binder;
    stirring the particulate admixture of vanadium oxide nanotubes, carbon black and EPDM binder;
    spreading the stirred particulate admixture onto a surface;
    extracting electrodes from the spread particulate admixture; and
    drying the extracted electrodes.

2. The method of claim 1 wherein said particulate admixture comprises 60–90% by weight of vanadium oxide nanotubes, 4–30% by weight of carbon black, and 2–20% by weight of EPDM binder.

3. The method of claim 1 wherein said particulate admixture comprises 70–85% by weight of vanadium oxide nanotubes, 5–20% by weight of carbon black, and 5–15% by weight of EPDM binder.

4. The method of claim 3 wherein said particulate admixture preferably comprises 80% by weight of vanadium oxide nanotubes, 10% by weight of carbon black and 10% by weight of EPDM binder.

5. The method of claim 3 wherein said particulate admixture preferably comprises 80% by weight of vanadium oxide nanotubes, 15% by weight of carbon black and 5% by weight of EPDM binder.

6. The method of claim 1 wherein the EPDM binder is present in a solvent.

7. The method of claim 6 wherein the concentration of said EPDM binder in said solvent is 5% by weight.

8. The method of claim 6 wherein said solvent is cyclohexane.

9. The method of claim 1 wherein said particulate admixture is stirred on a magnetic stirrer for twenty four hours, and spread onto graphitised aluminum foil.

10. The method of claim 1 wherein said extracted electrodes are dried under vacuum.

11. The method of claim 10 wherein said extracted electrodes are dried at about 120° C., for at least twelve hours in an argon-filled glove box.

12. The method of claim 1 wherein said vanadium oxide nanotubes comprise metal ions selected from the group consisting of $Mn^{2+}$, $Mg^{2+}$, $Ca^{2+}$, $Fe^{2+}$, $Fe^{3+}$, and $Na^+$ ions.

13. The method of claim 1 wherein said vanadium oxide nanotubes comprise hexadecylamine.

14. The method of claim 1 wherein said vanadium oxide nanotubes comprise dodecylamine.

15. A vanadium oxide nanotube electrode prepared by a method, the method comprising:
    admixing a particulate form of vanadium oxide nanotubes with carbon black and EPDM binder;
    stirring the particulate admixture of vanadium oxide nanotubes, carbon black and EPDM binder;
    spreading the stirred particulate admixture onto a surface;
    extracting electrodes from the spread particulate admixture; and
    drying the extracted electrodes.

16. The electrode of claim 15 wherein said particulate admixture comprises 60–90% by weight of vanadium oxide nanotubes, 4–30% by weight of carbon black, and 2–20% by weight of EPDM binder.

17. The electrode of claim 15 wherein said particulate admixture comprises 70–85% by weight of vanadium oxide nanotubes, 5–20% by weight of carbon black, and 5–15% by weight of EPDM binder.

18. The electrode of claim 15 wherein said particulate admixture comprises vanadium oxide nanotubes, carbon black and EPDM binder at 80:10:10 by weight respectively.

19. The electrode of claim 15 wherein said particulate admixture comprises vanadium oxide nanotubes, carbon black and EPDM binder at 80:15:5 by weight respectively.

20. The electrode of claim 15 wherein said vanadium oxide nanotubes comprise metal ions selected from the group consisting of $Mn^{2+}$, $Mg^{2+}$, $Ca^{2+}$, $Fe^{2+}$, $Fe^{3+}$, and $Na^+$ ions.

21. The electrode of claim 15 wherein said vanadium oxide nanotubes comprise hexadecylamine.

22. The electrode of claim 15 wherein said vanadium oxide nanotubes comprise dodecylamine.

23. A rechargeable lithium battery comprising, at least one lithium anode, at least one vanadium oxide nanotube cathode, and an electrolyte comprising a solution of a lithium salt in a solvent, wherein said solvent comprises ethylene carbonate and dimethyl carbonate in a 2:1 ratio by volume respectively.

24. The rechargeable battery of claim 23 wherein said vanadium oxide nanotube cathode is prepared by the method of claim 1.

25. The rechargeable lithium battery of claim 23 wherein said vanadium oxide nanotube cathode is the electrode of claim 15.

\* \* \* \* \*

UNITED STATES PATENT AND TRADEMARK OFFICE
CERTIFICATE OF CORRECTION

PATENT NO. : 6,653,022 B2
DATED : November 25, 2003
INVENTOR(S) : Kristina Edstrom et al.

It is certified that error appears in the above-identified patent and that said Letters Patent is hereby corrected as shown below:

Column 1,
Line 66, delete "Nester" and replace with -- Nesper --.

Column 5,
Line 19, delete "001" and replace with -- 00$\ell$ --.
Line 24, delete "20" and replace with -- 2$\theta$ --.

Column 7,
Lines 1 and 2, delete "20" and replace with -- 2$\theta$ --.

Signed and Sealed this

Thirteenth Day of July, 2004

JON W. DUDAS
*Acting Director of the United States Patent and Trademark Office*